United States Patent
Ota

(10) Patent No.: US 7,969,616 B2
(45) Date of Patent: Jun. 28, 2011

(54) SYSTEMS AND METHODS FOR EFFICIENT PRINT JOB COMPRESSION

(75) Inventor: Ken Ota, Cupertino, CA (US)

(73) Assignee: Konica Minolta Systems Laboratory, Inc., Tokyo (JP)

( * ) Notice: Subject to any disclaimer, the term of this patent is extended or adjusted under 35 U.S.C. 154(b) by 1124 days.

(21) Appl. No.: 11/731,197

(22) Filed: Mar. 30, 2007

(65) Prior Publication Data

US 2008/0239345 A1    Oct. 2, 2008

(51) Int. Cl.
*H04N 1/405* (2006.01)
*H04N 1/60* (2006.01)

(52) U.S. Cl. .................. 358/3.03; 358/1.9; 358/534

(58) Field of Classification Search .............. 358/1.1, 358/1.2, 1.9, 2.1, 2.99, 3.01, 3.02, 3.03, 3.04, 358/3.05, 3.06, 3.07, 3.08, 3.09, 3.1, 3.23, 358/3.3, 1.11, 1.15, 1.16, 1.17, 1.18, 534, 358/535, 536, 426.02, 426.07, 426.11, 426.13, 358/426.14; 382/166, 232, 235, 251, 252; 347/183, 184, 131; 345/596; 399/180, 181
See application file for complete search history.

(56) References Cited

U.S. PATENT DOCUMENTS

| | | | | |
|---|---|---|---|---|
| 5,621,543 A | * | 4/1997 | Oomoto | 382/243 |
| 5,940,585 A | * | 8/1999 | Vondran et al. | 358/1.15 |
| 5,999,710 A | * | 12/1999 | Smith et al. | 358/1.15 |
| 2007/0115506 A1 | * | 5/2007 | Yada | 358/3.06 |

* cited by examiner

*Primary Examiner* — Dov Popovici
(74) *Attorney, Agent, or Firm* — Finnegan, Henderson, Farabow, Garrett & Dunner, L.L.P.

(57) ABSTRACT

Systems and methods described herein provide for an efficient method for print job compression. In some embodiments, threshold halftone lookup tables directed to specific object types are used to compare pixel data for specific detected objects. Pixel data for such specified objects may be encoded using the appropriate object-specific threshold halftone lookup table into one of two multi-bit values, which serve to increase the frequency of repetitive or redundant encoded data and permit efficient compression by algorithms that exploit data repetition and/or redundancy. The methods described herein are applicable to a variety of printers, including raster and PDL printers.

20 Claims, 7 Drawing Sheets

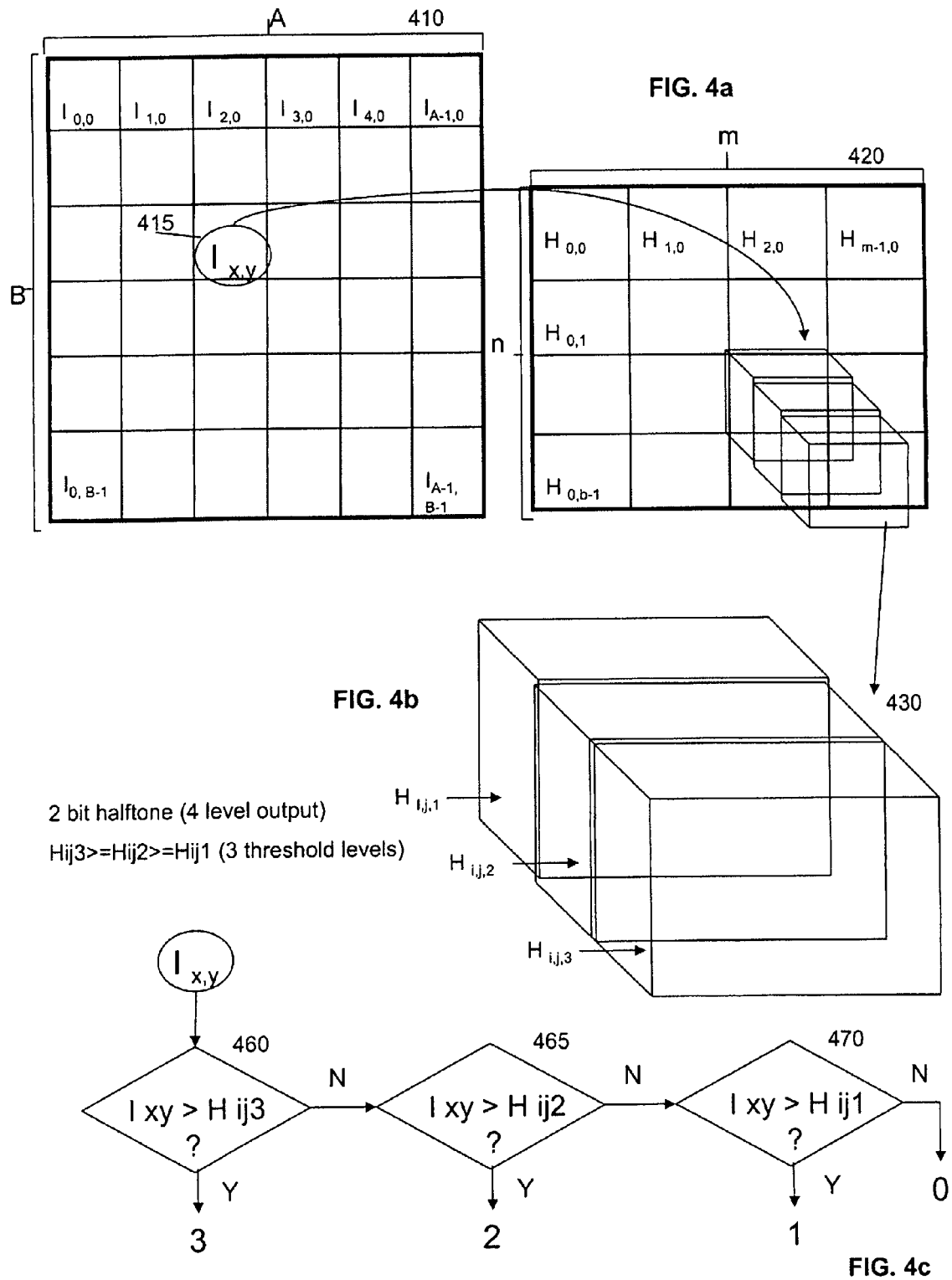

SYSTEMS AND METHODS FOR EFFICIENT PRINT JOB COMPRESSION

BACKGROUND

1. Field of the Invention

This description relates to the field of printing, and more specifically to systems and methods for print job size compression.

2. Description of Related Art

A printer file provides the data necessary for the printer to render images. For a raster printer, these files may be generated in a host and transferred from host memory to the raster printer. For printers that are capable of processing Page Description Language (PDL) files, the printer file may be generated by the printer, and temporarily stored in internal memory.

Large printer files take up greater network bandwidth for file transfers and can greatly increase print job processing time. Moreover, large files may significantly decrease available printer memory capacity, which can also lead to increased print job processing time. Conventional methods of reducing printer file size may sacrifice image quality to achieve decreased file size because printer file compression may take place without regard to the nature of objects present in the printer file. For example, pictures, photographs, and other images may be compressed resulting in a degradation of print output quality. Thus, there is a need for systems and methods to reduce printer file sizes, while maintaining the quality of printer output.

SUMMARY

In accordance with the present invention, systems, methods, and devices are presented which reduce the size of printer files by facilitating increased compression. In some embodiments, a method for converting first size pixel data into multi-bit halftone encoded data of a second size equal to or less than the first size comprises detecting at least one of a plurality of object types; comparing at least one pixel data value for a detected object type to at least one corresponding threshold value in at least one threshold halftone lookup table for that object type; and generating at least one halftone encoded data value of the second size corresponding to the at least one pixel data value. The generated halftone encoded data value is either zero, if the pixel data value is less than or equal to the corresponding threshold value(s) in the threshold halftone lookup table; or the halftone encoded data is the maximum value capable of being represented by the second size data otherwise.

The object types comprise image, text, and graphics objects. A separate threshold halftone lookup table may be used for text objects and graphics objects, or a single threshold halftone lookup table may be used for both text and graphics objects. In some embodiments, an encoded printer file may be generated using the halftone encoded data of the second bit size; and the encoded printer file may be compressed and transferred to a printer and/or stored.

These and other embodiments are further explained below with respect to the following figures.

BRIEF DESCRIPTION OF THE DRAWINGS

FIG. 4a shows a relationship between exemplary pixel data and an exemplary 2-bit threshold halftone look up table.

FIG. 4b shows an enlarged view of a cell in the exemplary 2-bit halftone lookup table of FIG. 5a.

FIG. 4c illustrates an exemplary approach for converting image data to encoded data.

DETAILED DESCRIPTION

In accordance with the present invention, systems and methods for printer file size compression are presented. In some embodiments existing compression protocols and image rendering may be used.

Figure 1:
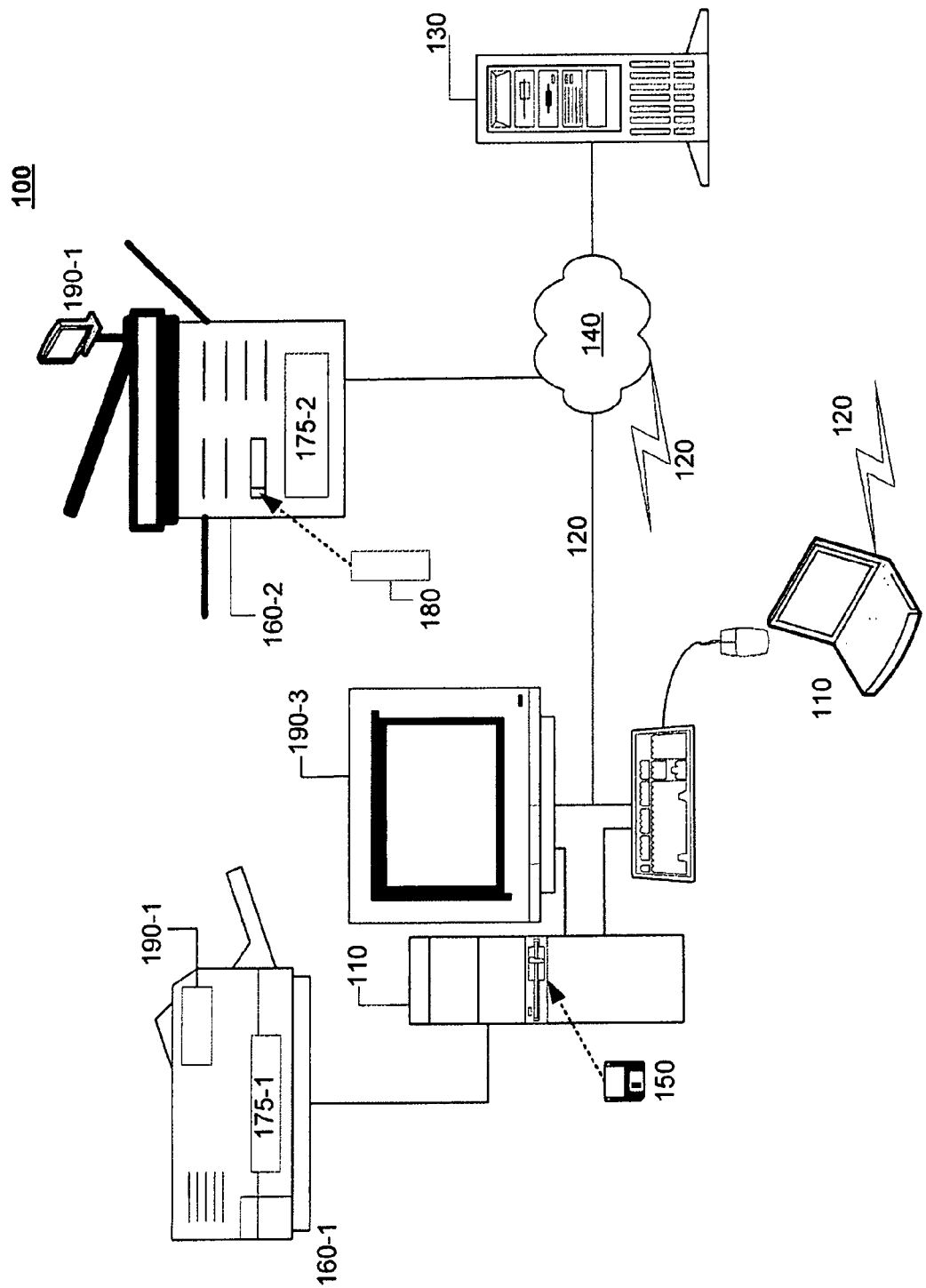
FIG. 1 shows a block diagram of an exemplary system for job image compression.

FIG. 1 shows an exemplary block diagram of a system for job image compression. A computer software application consistent with the present invention may be deployed on one or more networked computers, or printers, as shown in FIG. 1, that are connected through communication links that allow information to be exchanged using conventional communication protocols and/or data port interfaces.

As shown in FIG. 1, exemplary system 100 includes a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may be capable of executing software (not shown) that allows the control and configuration of printer 160, such as exemplary printers 160-1 and 160-2.

Computing device 110 may contain a removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. Portions of software applications may reside on removable media and be read and executed by computing device 110 using removable media drive 150. In some embodiments, results or reports generated by applications may also be stored on removable media.

Connection 120 couples computing device 110, server 130, and printer 160-2 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, SCSI, FIREWIRE, and/or BNC ports for transmission of data through the appropriate connection 120. The communication links could be wireless links or wired links or any combination that allows communication between computing device 110, server 130, and printer 160-2.

Network 140 could include a Local Area Network (LAN), a Wide Area Network (WAN), or the Internet. In some embodiments consistent with the present invention, information sent over network 140 may be encrypted to ensure the security of the data being transmitted.

Exemplary printer 160-2, may be a network printer, and can be connected to network 140 through connection 120. In some embodiments, a printing device, such as exemplary printer 160-1, may be a local or dedicated printer and connected directly to computing device 110 and/or server 130 and/or other peripherals. Printing devices, such as exemplary printer 160-2, may also have ports for the connection of flash drives, USB drives, or other storage devices 180, as shown in FIG. 1. System 100 may include multiple printing devices and other peripherals (not shown), according to embodiments of the invention.

Printer 160 may be controlled by hardware, firmware, or software, or some combination thereof. Printer 160 may include one or more print controller boards 175, such as exemplary print controllers 175-1 and 175-2, which may control the operation of printing devices 160. Printing devices 160 may be controlled by firmware or software resident on memory devices in print controllers 175. In general, print controllers 175 may be internal or external to printer 160. In some embodiments, printer 160 may also be controlled in part by software running on computing device 110 or server 130.

Printers, such as exemplary printers 160-2 and 160-1, may also include consoles 190 such as consoles 190-1 and 190-2, or other interfaces to allow configuration options to be set and other messages to be displayed. In some embodiments, one or more configuration options may be set using a display or user-interface on a monitor for a computer coupled to printers 160. For example, user interfaces to set one or more configuration options on printer 160-1 may be displayed on monitor 190-3, which is coupled to computer 110. A user interface to set configuration options on printer 160-2 may also be displayed on monitor 190-3, using software running on server 130.

In some embodiments, configuration parameters pertaining to printing device 160 may be user-configurable. For example, the print resolution, document sizes, color options, and other configuration parameters may be user-configurable. A user may also be able to specify input trays and the use of automatic document feeders to allow batch processing of documents. Users may also be able to log into a printer 160 to perform administrative functions such as to enable software or firmware on printer 160 to perform various functions. In some embodiments, the log in process may require a password or other user-authentication mechanism.

A computer software application consistent with the present invention may be deployed on any of the exemplary computers, or printers as shown in FIG. 1. For example, computing device 110 could execute software that may control and/or monitor the operation of printer 160-1. An independent application may also execute concurrently on printer 160-2 based on its configuration. In another example, an application resident on print controller 175-1 could be configured using computer 110 but execute on printer 160-1. In general, applications may execute in whole or in part on one or more computers, print controllers, or printers in the system.

Figure 2:
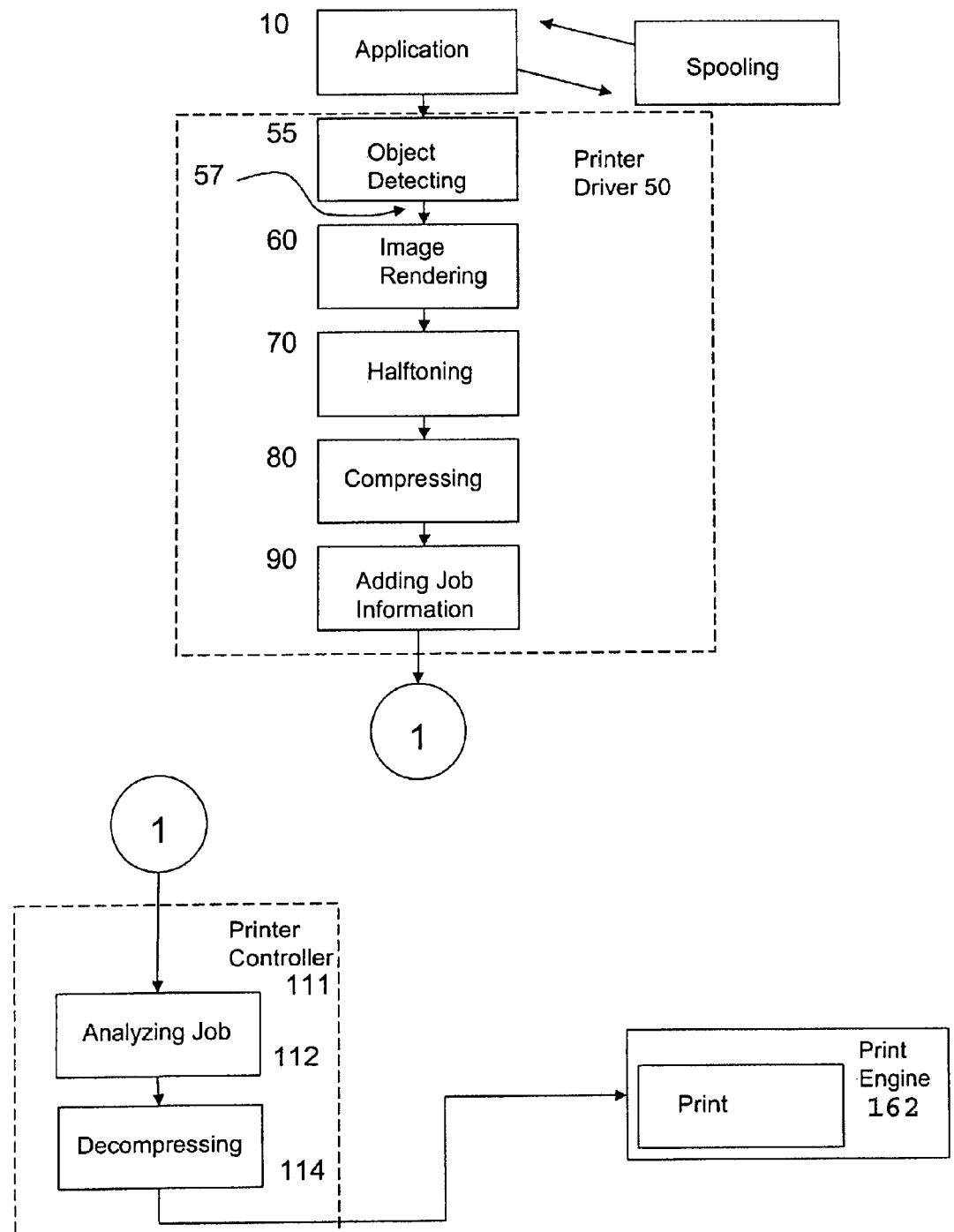
FIG. 2 shows an exemplary block diagram of components in a typical printer driver.

FIG. 2 shows an exemplary block diagram of components in a typical printer driver. As shown in FIG. 2, a printer file generated by exemplary application 10 is processed by object detecting module 55. Exemplary application 10 may be a document processing application such as Word, Adobe Acrobat, or any other application capable of generating printable output. Printer files can be multi-object files comprising image data, graphics data, and text data. Object detecting module 55 may generate command level code 57, which is received by an image rendering module 60.

In some embodiments, exemplary image rendering module 60 produces pixel data of a first size, which may be converted using a threshold halftone lookup table 70 to encoded data of a second size. Halftoning may be used to convert a continuous-toned image to an image rendered by using a series of strategically placed dots. In order to simulate gradations of light or color, the relative density of dots per given cell size, dots per inch ("dpi") is varied. A higher density of dots creates a darker image portion. Standard halftoning techniques allow image file sizes to be reduced but may also lead to degradation in the quality of printed images. For example, an 8-bit pixel may be converted to 4-bit encoded halftone data. One halftoning method may compare a pixel value to a corresponding set of values in a threshold halftone lookup table. For example, 8-bit pixel data may take on a new 4-bit value by comparing it with multiple threshold values and converting the logical result into a 4-bit binary number. In some embodiments, binary search algorithms and other well-known techniques may be used to limit the number of comparisons. Halftone conversion decreases the size of the data file by decreasing the bit-size per pixel and creates an encoded printer file, which is usable by printer 160 to print the desired image.

In some embodiments, the encoded data may be output to compression module 80 for subsequent compression. Standard compression techniques may be used to compress print file size or the algorithms may be proprietary to a printer manufacturer or they may be model specific. When the compressed file is received by the printer it may be decompressed using corresponding decompression algorithms. In some embodiments, exemplary job information module 90 may add additional information to the compressed printer file, which may then be transferred to the print controller 175. Conventional compression methods typically compress these halftone encoded printer files before transferring the printer file to another module or printer. Compression techniques at this stage typically exploit data repetition/redundancy. Repetition or redundancy compression techniques may be used to further reduce file size but may be limited by the occurrence of repetitive or redundant data, if image quality is to be maintained. For example, well-known techniques may be used to compress a series of like data values such as a series of 1's or 0's. Files with a greater number of occurrences of one or more series of like data values may be compressed to a greater degree.

Figure 3:
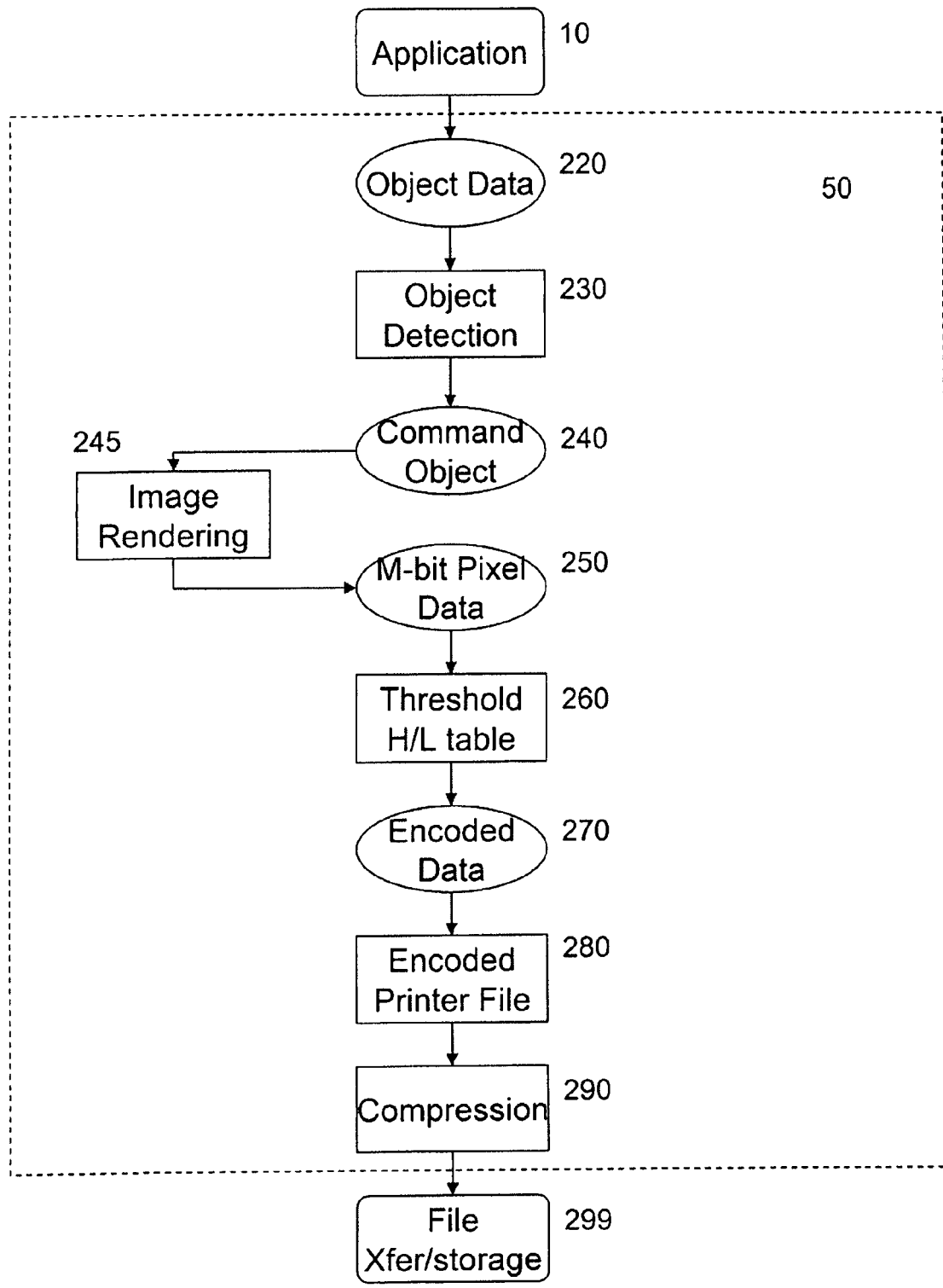
FIG. 3 shows an exemplary block diagram indicating data flow in a system for printer data processing.

Analyzing module 112 may analyze the received printer file and decompression module 114 may decode and decompress information in the printer file. In some embodiments, analyzing and decoding/decompression may be performed in print controller 175 and forwarded to the print engine 162 for printing. FIG. 3 shows an exemplary block diagram indicating data flow in a system for printer data processing. Application 10 provides object data 220 to a printer driver 50. In some embodiments, exemplary object detection module 230 may generate command object code 240 using object data 220. Image rendering module 245 may receive command object code 240 and generate corresponding multi-bit pixel data 250 of a first size. Multi-bit pixel data 250 may be converted into encoded data 270 of a second lower size using threshold halftone lookup table 260. Encoded data 270 may be a lesser number of bits as compared to the multi-bit pixel data. Encoded data 270 may be placed in encoded printer file 280, which may under go compression in step 290 before either file transfer or file storage in step 299. In some embodiments, compression effected in step 290 may exploit data repetition/redundancy in encoded printer file 280.

FIG. 4*a* shows a relationship between exemplary pixel data 415 in pixel table 410 and exemplary threshold halftone lookup table 420. FIG. 4*b* shows an enlarged view of a cell in the exemplary 2-bit halftone lookup table of FIG. 4*a*. As shown in FIG. 4*a*, pixel data is mapped using subscripts x and y as coordinates. Exemplary threshold halftone lookup table 420 is mapped using subscripts i and j as coordinates. For the purposes of this description, pixel value $I_{x,y}$ 415 is mapped to a set of corresponding values $H_{i,j}$ in exemplary threshold halftone lookup table 420, where x=i, and y=j. For example, pixel data $I_{2,2}$ 415 is compared to its corresponding threshold values $H_{2,2,1}$, $H_{2,2,2}$, $H_{2,2,3}$ in threshold halftone lookup table 420, which is enlarged for clarity 430 in FIG. 4*b*.

The halftone threshold values are shown for pixel $I_{2,2}$ as a series of three blocks. These blocks may indicate a third dimension of exemplary halftone lookup table 420. As shown in FIG. 4*b*, three different threshold values $H_{i,j,1}$, $H_{i,j,2}$, and $H_{i,j,3}$ are used. Comparison operations using pixel value $I_{x,y}$ 415 and threshold values $H_{2,2,1}$, $H_{2,2,2}$, $H_{2,2,3}$ in halftone lookup table 420 may yield one of four possible outputs, 3, 2, 1, or 0. FIG. 4*c* illustrates an exemplary approach for converting image data to encoded data. Pixel value $I_{x,y}$ 415 is compared to its corresponding threshold values. If pixel value $I_{x,y}$ is greater than $H_{i,j,3}$, in step 460, then the encoded value of $I_{x,y}$ may be set to 3, ("11" in binary or $[11]_2$). If pixel value $I_{x,y}$ 415 is not greater than $H_{i,j,3}$, then the pixel value is compared to $H_{i,j,2}$, in step 465. If pixel value $I_{x,y}$ 415 is greater than $H_{i,j,2}$ then the encoded value of $I_{x,y}$ may be set to 2 ("10" in binary or $[10]_2$). If pixel value $I_{x,y}$ 415 is not greater than $H_{i,j,2}$ then pixel value $I_{x,y}$ 415 is compared to $H_{i,j,1}$, in step 470. If pixel value $I_{x,y}$ 415 is greater than $H_{i,j,1}$ then the encoded value of $I_{x,y}$ 415 is set to 1, ("01" in binary or $[01]_2$). If the pixel value is not greater than $H_{i,j,1}$, then the encoded value may be set to 0 ("00" in binary or $[00]_2$). In some embodiments, binary search or other techniques may be used to minimize the number of comparisons.

Figure 5A:
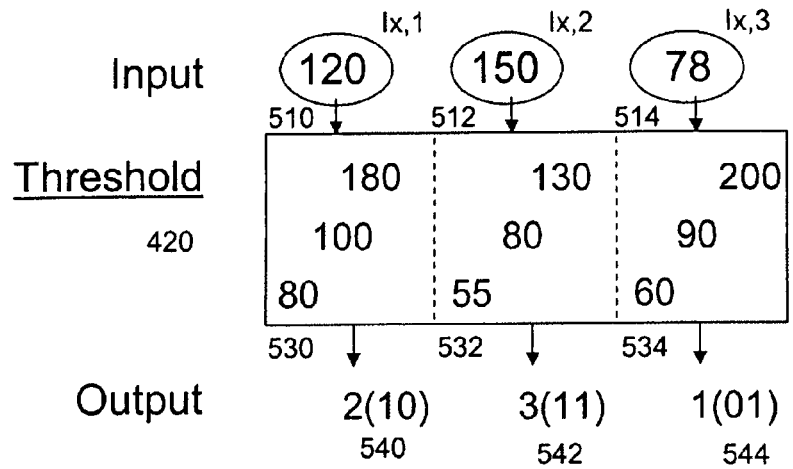
FIG. 5a illustrates an exemplary 2-bit halftone encoding of pixel data values using an exemplary halftone lookup table.

FIG. 5*a* illustrates an exemplary 2-bit halftone encoding of pixel data values using an exemplary halftone lookup table. As shown in FIG. 5*a*, three exemplary 8-bit input pixels $I_{x,1}$ 510, $I_{x,2}$ 512, and $I_{x,3}$ 514 have values 120, 150, and 78, respectively. Exemplary conventional 2-bit threshold halftone lookup table 420 comprises three threshold values for each pixel. In the example illustrated in FIG. 5*a*, the three threshold values $H_{i,j,3}$, $H_{i,j,2}$, and $H_{i,j,1}$ for $I_{x,1}$ 510 are 180, 100, and 80, respectively. The threshold values may be used convert 8-bit pixel $I_{x,1}$ to 2-bits.

Figure 5B:
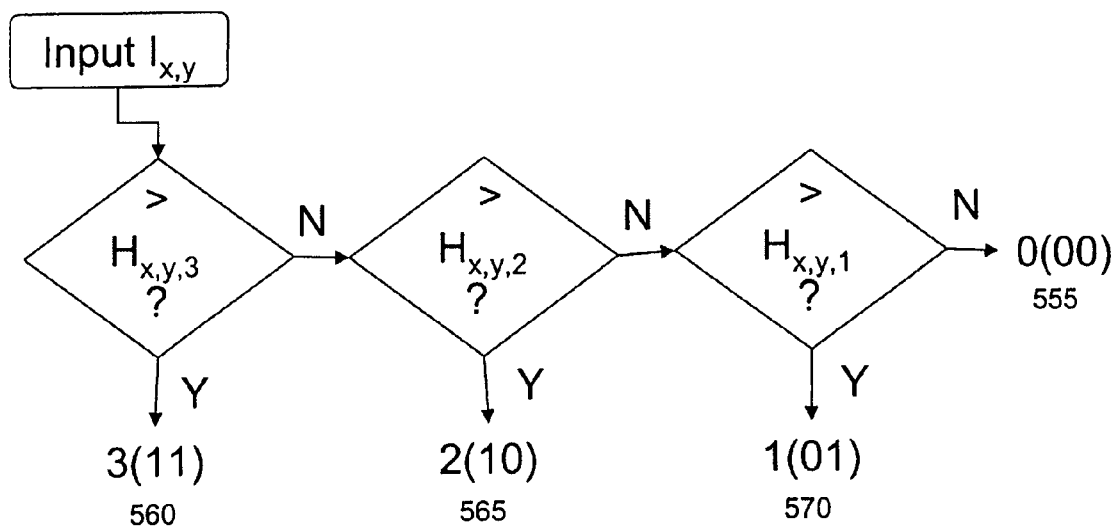
FIG. 5b illustrates an exemplary approach to convert exemplary 8-bit pixel values to 2-bit halftone encoded data.

FIG. 5*b* illustrates an exemplary approach to convert exemplary 8-bit pixel values to 2-bit halftone encoded data. In some embodiments, the process illustrated in FIG. 5*b* may be repeated for each pixel $I_{x,y}$ 415 in pixel table 410. The process is described below for pixels $I_{x,1}$ 510, $I_{x,2}$ 512, and $I_{x,3}$ 514. In step 560, if $I_{x,1}$ 510 is greater than $H_{i,j,3}$, then the resulting 2-bit encoded value may be set to 3 or $[11]_2$. If pixel value $I_{x,1}$ 510 is not greater than $H_{i,j,3}$, then the pixel value is compared to $H_{i,j,2}$, in step 565. If $I_{x,1}$ 510 is greater than $H_{i,j,2}$, then the encoded value may be set to 2 or $[10]_2$. If pixel value $I_{x,1}$ 510 is not greater than $H_{i,j,2}$, then the pixel value is compared to $H_{i,j,1}$, in step 570. If $I_{x,1}$ 510 is greater than $H_{i,j,1}$, then the encoded value may be set to 1 or $[01]_2$. In step 555, $I_{x,1}$ 510 has been determined to be less than all three threshold values, resulting in an encoded 2-bit value of 0 or $[00]_2$. The process above is repeated for $I_{x,2}$ 512, and $I_{x,3}$ 514. Consequently, pixel $I_{x,1}$ 510 with a value 120 is greater than $H_{i,j,2}$, which has a value of 100. Therefore pixel $I_{x,1}$ 510 is encoded as 2 or $[10]_2$. Similarly, the comparison operations yield an encoded value of 3 or $[11]_2$ for pixel $I_{x,2}$ 512, and an encoded value of 1 or $[01]_2$ for pixel $I_{x,3}$.

Figure 6:
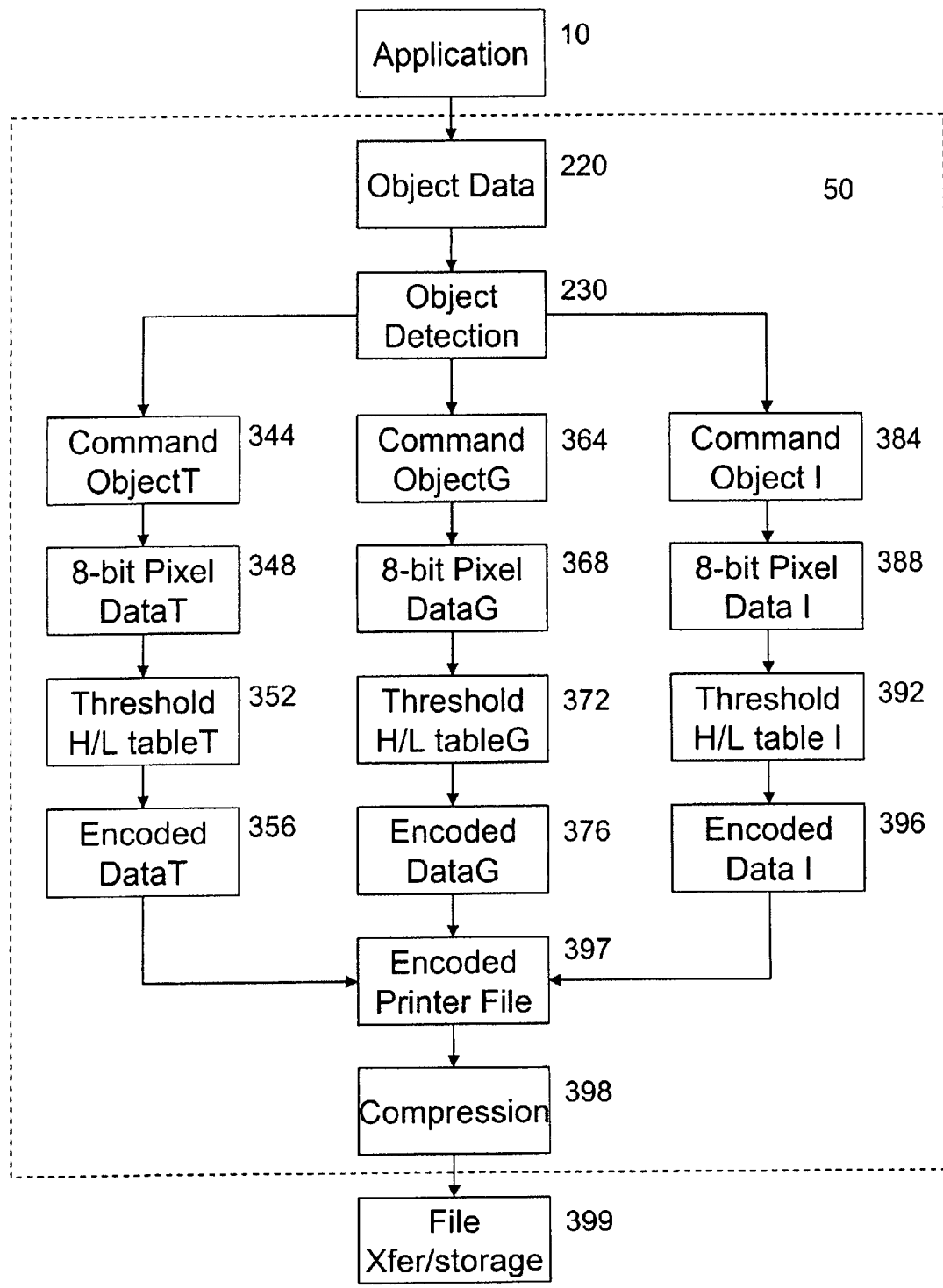
FIG. 6 shows an exemplary block diagram indicating data flow in a system for exemplary halftone encoding according to some described embodiments.

FIG. 6 shows an exemplary block diagram indicating data flow in a system for exemplary halftone encoding according to some embodiments. Printed pages typically include multiple objects. A printer file may include multi-object data, comprising one or more of image data, graphics data, text data, and other types that may be supported by print driver 50, print controller 175, and/or printer 160. As shown in FIG. 6, application 10 may provide object data 220 to printer driver 50. In some embodiments, object detection module 230 may detect various object types present in a printer file and generate corresponding object command codes for text objects 344, graphics objects 364, and/or image objects 384.

In the exemplary embodiment shown in FIG. 6, the rendering of command object code may yield 8-bit pixel data for each object. In the exemplary embodiment shown in FIG. 6, Pixel DataT designates text data, Pixel DataG designates graphics data, and Pixel DataI designates image data. In some embodiments, Pixel DataT 348, Pixel DataG 368, and Pixel DataI 388, may be compared with their respective threshold halftone lookup tables, 352, 372, and 392.

Image pixel data 388 may be compared to an image threshold halftone lookup table 392, which may be similar to table 420 of FIG. 5*a*. In some embodiments, Image threshold halftone lookup table 392 may hold threshold values in descending order of magnitude or in sorted order. As shown in FIGS. 5*a* and 5*b*, $H_{i,j,3}$, $H_{i,j,2}$, and $H_{i,j,1}$, are sorted in descending order of magnitude. Resulting encoded data 396 will vary between the minimum, 0, and 3. In general, values for n-bit encoded data will vary between 0 and $2^n-1$, which is the maximum value capable of being represented by n-bits of data.

Figure 7:
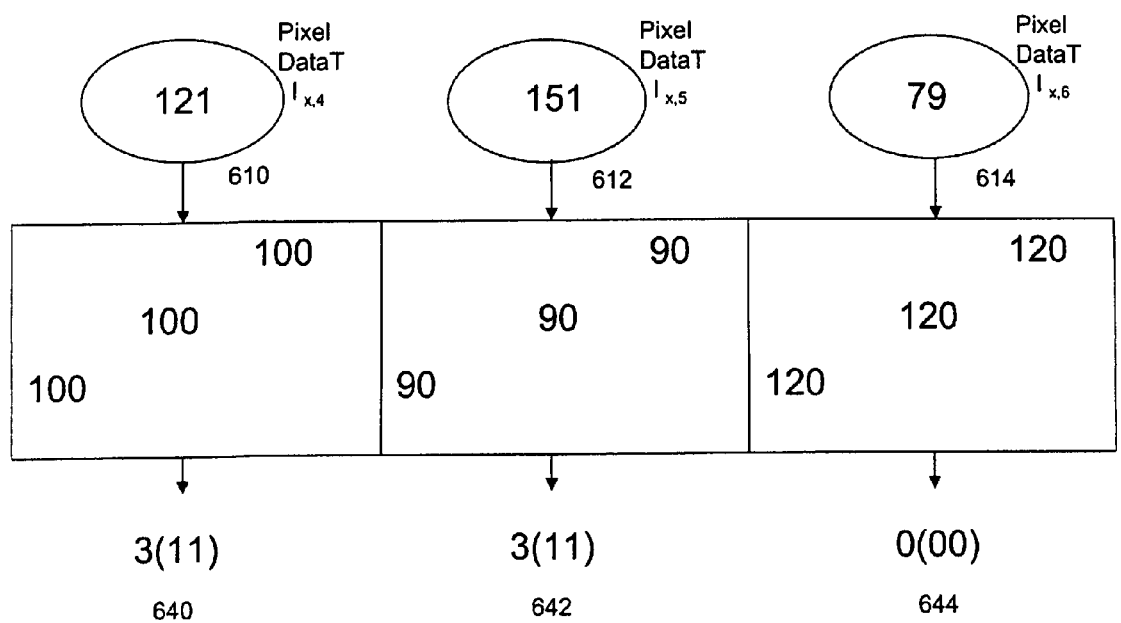
FIG. 7 shows an exemplary embodiment of a text threshold lookup table.

FIG. 7 shows an exemplary embodiment of text threshold halftone lookup table 352. Text pixel data 348 is compared to values in text threshold halftone lookup table 352. An exemplary embodiment of a text threshold halftone lookup table 352 is shown in FIG. 7. Three 8-bit text pixel data 348 values 121, 151, and 79 are shown for three different text object pixels $I_{x,4}$ 610, $I_{x,5}$ 612, and $I_{x,6}$ 614, respectively. Each pixel value may be compared to its corresponding set of threshold halftone lookup table values in text threshold halftone lookup table 352. In some embodiments, the values in text threshold halftone lookup table 352 may be equal and set to a single value. This yields an encoded output value of either 0 or 1 (represented using an appropriate number of bits) when text object pixel values are compared to their corresponding halftone threshold values. In FIG. 7, encoded values $[00]_2$, or $[11]_2$ are generated when text object pixel values are compared to their corresponding halftone threshold values.

In exemplary text threshold halftone lookup table 352 threshold values $H_{i,4,3}$, $H_{i,4,2}$, and $H_{i,4,1}$, are equal to each other and set to a value of 100 (decimal). Thus, the encoded value corresponding to pixel $I_{x,4}$ 610 is $[11]_2$. Similarly, the three threshold values $H_{i,5,3}$, $H_{i,5,2}$, and $H_{i,5,1}$, for pixel $I_{x,5}$ 612 are equal to each other and set to a value of 90. Thus, the encoded value corresponding to pixel $I_{x,5}$ 612 is also $[11]_2$. Threshold values for $H_{i,6,3}$, $H_{i,6,2}$, and $H_{i,6,1}$, for pixel $I_{x,6}$ 614 are equal to each other and set to a value of 120. This yields an encoded output value of $[00]_2$ corresponding to pixel $I_{x,6}$ 614. In some embodiments, a set of identical threshold values may be used for each pixel, but vary across pixels. In other embodiments, the threshold values may be constant across pixels and a single value used for all text objects.

In some embodiments, a threshold halftone lookup table that produces encoded 0 or 1 output (represented using an appropriate number of bits) may be constructed for graphics objects. In other embodiments, a threshold halftone lookup table that produces encoded 0 or 1 output (represented using an appropriate number of bits) may be constructed for other types of objects. In general, a threshold halftone lookup table that produces encoded 0 or 1 output may be used for any object where it has been determined that the representation of the object using single-bit halftone methods will not affect the quality of the printed output. In some embodiments, a single threshold halftone lookup table that produces encoded 0 or 1 output (represented using an appropriate number of bits) may be used for any object, which is to be represented in a manner similar to those used with single-bit halftoning methods.

In the exemplary embodiment shown in FIG. 6, three separate threshold halftone lookup tables 352, 372, and 392 are used for each object type. In an alternate embodiment, the same threshold halftone lookup table may be used for both image pixel data and graphics pixel data with a separate halftone threshold lookup table for text pixel data. In another embodiment, one lookup table may be used for both graphics and text while a separate conventional threshold halftone lookup table is used for image pixel data.

Encoded text data 356, encoded graphics data 376, and encoded image data 396 are placed in encoded printer file 397, which is compressed in step 398. In some embodiments, the use of compression methods that exploit data repetition/redundancy will yield an efficient compression of strings of 1's and 0's. In some embodiments, such compression will permit an efficient compression of text and graphics objects, which have been encoded as either 0 or 1 (represented using an appropriate number of bits). In some embodiments, because standard multi-bit algorithms have been applied to image objects a higher quality output may be generated for pictures, photographs, and like objects. The compressed printer file may be stored or transferred in step 399 for later decompression/decoding and printing.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers, operating systems, and printers that may be used in practicing embodiments of the instant invention.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer and printing apparatus and aspects of these processes may be implemented by any suitable combination of hardware, software, and/or firmware. For example, various general-purpose machines may be used with programs written in accordance with teachings of the invention, or it may be more convenient to reconfigure or construct a specialized printing apparatus or system to perform the required methods and techniques. As another example, the actual elements shown in printer driver 50 (FIGS. 2, 3, and 6) are only exemplary and may vary while still comporting with the spirit of the invention. For instance the function of data compression need not be performed within a printer driver module.

Embodiments of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method for converting first size pixel data into multi-bit halftone encoded data of a second size equal to or less than the first size, the method comprising:
   detecting at least one of a plurality of object types;
   comparing at least one pixel data value for a detected object type to corresponding threshold values in at least one threshold halftone lookup table for that object type; and
   generating at least one halftone encoded data value of the second size corresponding to the at least one pixel data value, wherein:
      the at least one halftone encoded data value is zero, if the pixel data value is less than or equal to its corresponding threshold values in the threshold halftone lookup table; or
      the halftone encoded data is the maximum value capable of being represented by the second size data otherwise.

2. The method of claim 1, wherein the object types comprise image, text, and graphics objects.

3. The method of claim 2, wherein the at least one threshold halftone lookup table for an object type is used for text objects.

4. The method of claim 2, wherein the at least one threshold halftone lookup table for an object type is used for graphics objects.

5. The method of claim 2, wherein the at least one threshold halftone lookup table for an object type is used for both text and graphics objects.

6. The method of claim 2, wherein one threshold halftone lookup table is used for text objects and a second threshold halftone lookup table is used for graphics objects.

7. The method of claim 1, wherein generating at least one halftone encoded data value of the second size for that object type further comprises:
   creating an encoded printer file using the halftone encoded data of the second size; and
   compressing the encoded printer file.

8. The method of claim 7, further comprising transferring the compressed encoded printer file to a printer.

9. The method according to claim 7, further comprising storing the compressed printer file in memory.

10. The method according to claim 9, wherein the compressed printer file is stored in memory internal to a printer.

11. The method of claim 1, wherein the method is performed on one or more of:
a computer coupled to a printer;
a print controller coupled to a printer; and
a printer.

12. A system comprising a computer coupled to a printer, wherein the computer and printer perform steps in a method converting first size pixel data into multi-bit halftone encoded data of a second size equal to or less than the first size, the method comprising:
detecting at least one of a plurality of object types;
comparing at least one pixel data value for a detected object type to corresponding threshold values in at least one threshold halftone lookup table for that object type; and
generating at least one halftone encoded data value of the second size corresponding to the at least one pixel data value, wherein:
the at least one halftone encoded data value is zero, if the pixel data value is less than or equal to its corresponding threshold values in the threshold halftone lookup table; or
the halftone encoded data is the maximum value capable of being represented by the second size data otherwise.

13. The system of claim 12, wherein the at least one threshold halftone lookup table for an object type is used for text objects.

14. The system of claim 12, wherein the at least one threshold halftone lookup table for an object type is used for graphics objects.

15. The system of claim 12, further comprising:
creating an encoded printer file using the halftone encoded data of the second size; and
compressing the encoded printer file.

16. A non-transitory computer-readable medium that stores instructions, which when executed by processor perform steps in a method converting first size pixel data into multi-bit halftone encoded data of a second size equal to or less than the first size, the steps comprising:
detecting at least one of a plurality of object types;
comparing at least one pixel data value for a detected object type to corresponding threshold values in at least one threshold halftone lookup table for that object type; and
generating at least one halftone encoded data value of the second size corresponding to the at least one pixel data value, wherein:
the at least one halftone encoded data value is zero, if the pixel data value is less than or equal to its corresponding threshold values in the threshold halftone lookup table; or
the halftone encoded data is the maximum value capable of being represented by the second size data otherwise.

17. The computer-readable medium of claim 16, wherein the at least one threshold halftone lookup table for an object type is used for text objects.

18. The computer-readable medium of claim 16, wherein the at least one threshold halftone lookup table for an object type is used for graphics objects.

19. The computer-readable medium of claim 16, wherein generating at least one halftone encoded data value of the second size for that object type further comprises:
creating an encoded printer file using the halftone encoded data of the second size; and
compressing the encoded printer file.

20. The computer-readable medium of claim 19, wherein generating at least one halftone encoded data value of the second bit size for that object type further comprises:
creating an encoded printer file using the halftone encoded data of the second bit size; and
compressing the encoded printer file.

* * * * *

UNITED STATES PATENT AND TRADEMARK OFFICE
CERTIFICATE OF CORRECTION

| | | |
|---|---|---|
| PATENT NO. | : 7,969,616 B2 | Page 1 of 1 |
| APPLICATION NO. | : 11/731197 | |
| DATED | : June 28, 2011 | |
| INVENTOR(S) | : Ken Ota | |

It is certified that error appears in the above-identified patent and that said Letters Patent is hereby corrected as shown below:

Col. 10, lines 30-35 Delete claim 20 in its entirety and insert therefor:
--20. The computer-readable medium of claim 19, further comprising transferring the compressed encoded printer file to a printer.--.

Signed and Sealed this
Thirty-first Day of July, 2012

David J. Kappos
*Director of the United States Patent and Trademark Office*